(12) United States Patent
Sugawara (10) Patent No.: US 6,414,795 B1
(45) Date of Patent: Jul. 2, 2002

(54) ILLUMINATION APPARATUS

(75) Inventor: Saburo Sugawara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/432,910

(22) Filed: Nov. 2, 1999

(30) Foreign Application Priority Data

Nov. 4, 1998 (JP) .......................................... 10-328883

(51) Int. Cl.[7] .......................... G02B 27/10; F21V 5/02; F21V 7/06
(52) U.S. Cl. ...................... 359/622; 362/169; 362/215; 362/268
(58) Field of Search ................................ 359/622, 623, 359/624, 621; 362/169, 215, 268

(56) References Cited

U.S. PATENT DOCUMENTS

| | | | |
|---|---|---|---|
| 4,988,188 A | * | 1/1991 | Ohta ........................... 362/268 |
| 6,246,526 B1 | | 6/2001 | Okuyama ................... 359/621 |
| 6,257,726 B1 | | 7/2001 | Okuyama .................... 353/20 |

FOREIGN PATENT DOCUMENTS

JP          9-269470          10/1997

* cited by examiner

*Primary Examiner*—Scott J. Sugarman
(74) *Attorney, Agent, or Firm*—Morgan & Finnegan LLP (57) ABSTRACT

In an illumination apparatus for illuminating a display device with a light beam from a light source through an illumination optical system, the illumination optical system includes a first lens array unit having a plurality of positive lens portions juxtaposed with each other, a second lens array unit having a plurality of negative lens portions juxtaposed with each other, and a third lens array unit having a plurality of positive lens portions juxtaposed with each other. The first to third lens array units are sequentially arranged from the light source side. The image-side focal point of the combined system of lens portions of the first and second lens array units is located at the third lens array unit. The object-side focal point of the combined system of lens portions of the second and third lens array units is located at the first lens array unit, thereby attaining a reduction in the size of the illumination apparatus.

18 Claims, 4 Drawing Sheets

ILLUMINATION APPARATUS

BACKGROUND OF THE INVENTION

1. Field of the Invention

The present invention relates to an illumination apparatus and projection apparatus and, more particularly, to an illumination apparatus and projection apparatus which are suited for a liquid crystal projector for enlarging/projecting an image formed by a liquid crystal display device (liquid crystal panel) on a screen or wall through a projection lens.

2. Related Background Art

Various liquid crystal projectors have been proposed, which are designed to illuminate a liquid crystal panel with a light beam from a light source and enlarge/project an image based on transmitted or reflected light from the liquid crystal panel on a screen or wall through a projection lens.

Figure 5:
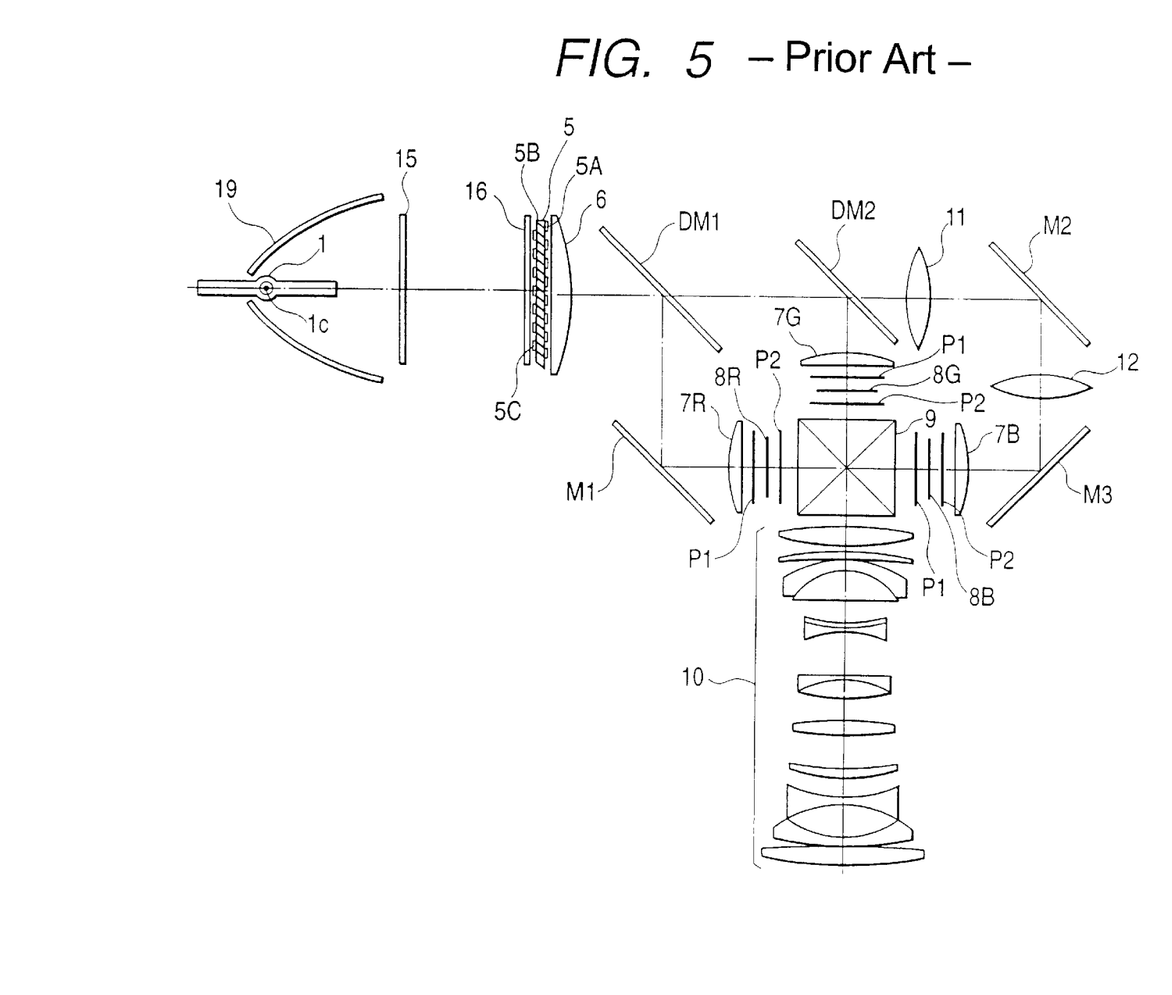
FIG. 5 is a schematic view showing the main part of a conventional projection apparatus.

FIG. 5 is a schematic view showing the main part of a conventional liquid crystal projector. The illumination optical system of the liquid crystal projector in FIG. 5 uses a combination of a light-emitting tube 1, parabolic mirror 19, and a pair of lens arrays 15 and 16.

Referring to FIG. 5, the white light emitted from a light-emitting portion 1c of the light-emitting tube (light source) 1 is almost collimated by the parabolic mirror 19, and the first lens array 15 forms the light source image from the light-emitting tube 1 on the center of each lens portion of the second lens array 16.

The focal length of the first lens array 15 is almost equal to that of the second lens array 16. The distance between the first and second lens arrays 15 and 16 is almost equal to the focal length-of the first lens array 15. The light beam focused by the first lens array 15 is separated into P-polarized light and S-polarized light by a polarization separating layer 5B of a polarization converting element 5. The P-polarized light is transmitted through the polarization separating layer 5B, and the S-polarized light is reflected by the layer 5B. The P-polarized light is phase-converted by a λ/2 retardation plate 5A to be aligned with the polarization axis of the S-polarized light.

All the light beams emitted from the polarization converting element 5 become polarized light beams having polarization axes in the same direction. The polarization converting element 5 has a blind-like light-shielding plate 5C.

The light beam emitted from the polarization converting element 5 is deflected by a first condenser lens 6 to be superimposed on display portions 8R, 8G, and 8B of image modulating units which are made up of liquid crystal panels for separately modulating R, G, and B light beams. The red light of the light beam emerging from the first condenser lens 6 is reflected by a dichroic mirror DM1, and the remaining green light and blue light are transmitted therethrough.

The red light reflected by the dichroic mirror DM1 is guided to the display portion 8R of the red image modulating unit through a reflecting mirror M1 and second condenser lens 7R. The light transmitted through the dichroic mirror DM1 is separated into green light and blue light by a dichroic mirror DM2. The green light is reflected by the dichroic mirror DM2 to be guided into the display portion 8G of the green image modulating unit through a second condenser lens 7G.

The blue light transmitted through the dichroic mirror DM2 is focused by a condenser lens 11 and reflected by a reflecting mirror M2. The reflected light is guided to the display portion 8B of the blue image modulating unit by a relay lens 12 through a reflecting mirror M3 and second condenser lens 7B.

Referring to FIG. 5, polarizing plates P1 and P2 are set on the incident and exit sides, respectively. The second condenser lenses 7R, 7G, and 7B serve to focus the light beam emerging from the first condenser lens 6 onto the entrance pupil of a projection lens 10. A cross-dichroic prism 9 is placed between the projection lens 10 and the display portions 8R, 8G, and 8B of the image modulating units to perform color synthesis.

The projection lens 10 is designed to be telecentric with respect to the display portions 8R, 8G, and 8B of the image modulating units. The incident tangle on the dichroic film surface of the cross-dichroic prism 9 remains constant throughout the entire dichroic film, thereby preventing color irregularity due to changes in incident angle on the dichromic film.

The light beams respectively modulated by the display portions 8R, 8G, and 8B of the image modulating units are subjected to color synthesis in the cross-dichroic prism 9. The resultant image is enlarged/projected on a screen (not shown) through the projection lens 10.

To reduce the sizes of the pair of lens arrays 15 and 16 in the optical axis direction in the general liquid crystal projector shown in FIG. 5, the microlenses constituting the pair of lens arrays 15 and 16 may be reduced in size.

However, the size of the blind-like polarization converting element 5 used in combination with the pair of lens arrays 15 and 16 must be reduced in proportion to the sizes of the lens arrays 15 and 16. This makes it difficult to manufacture the micro-prism of the polarization converting element 5. In addition, the loss of light is increased by a film omission on a peripheral portion of the surface 5B forming the polarization separating layer of the prism (vignetting on the deposition surface due to a mask for preventing a deposition material from spreading to a surface other than the deposition surface in a deposition process). For this reason, the size of each lens of each lens array cannot be reduced beyond a certain limit. This makes it difficult to reduce the sizes of the pair of lens arrays in the optical axis direction.

SUMMARY OF THE INVENTION

It is an object of the present invention to provide an illumination apparatus which can reduce the size of an illumination optical system in the optical axis direction by using three lens arrays having appropriate refracting powers in part of the illumination optical system without decreasing the size of each lens of the lens arrays, and a projection apparatus using the illumination apparatus.

According to the present invention, there is provided an illumination apparatus for illuminating a display device with a light beam from a light source through an illumination optical system, the illumination optical system including a first lens array unit having a plurality of positive lens portions juxtaposed with each other, a second lens array unit having a plurality of negative lens portions juxtaposed with each other, and a third lens array unit having a plurality of positive lens portions juxtaposed with each other, the first to third lens array units being sequentially arranged from a light source side.

This apparatus further comprise a reflector for reflecting some light component of a light beam from the light source and guiding the light component as a collimated light beam to the first lens array unit.

In this apparatus, an image-side focal point of combined system of the first and second lens array units is located near the third lens array unit, and an object-side focal point of a combined system of the second and third lens array units is located near the first lens array unit.

In this apparatus, the reflector is made of an elliptic mirror or parabolic mirror.

This apparatus further comprises a lens having a negative refracting power between the light source and the first lens array unit.

In this apparatus, each of the plurality of positive lens portions of the first lens array unit is made of a plano-convex lens having a convex surface facing the light source side, each of the plurality of negative lens portions of the second lens array unit is made of a plano-concave lens having a flat surface facing the light source side, and each of the plurality of positive lens portions of the third lens array unit is made of a plano-convex lens having a flat surface facing the light source side.

The above and other objects, features, and advantages of the present invention will be apparent from the following detailed description in conjunction with the accompanying drawings and the appended claims.

DETAILED DESCRIPTION OF THE PREFERRED EMBODIMENTS

Figures 1, 2:
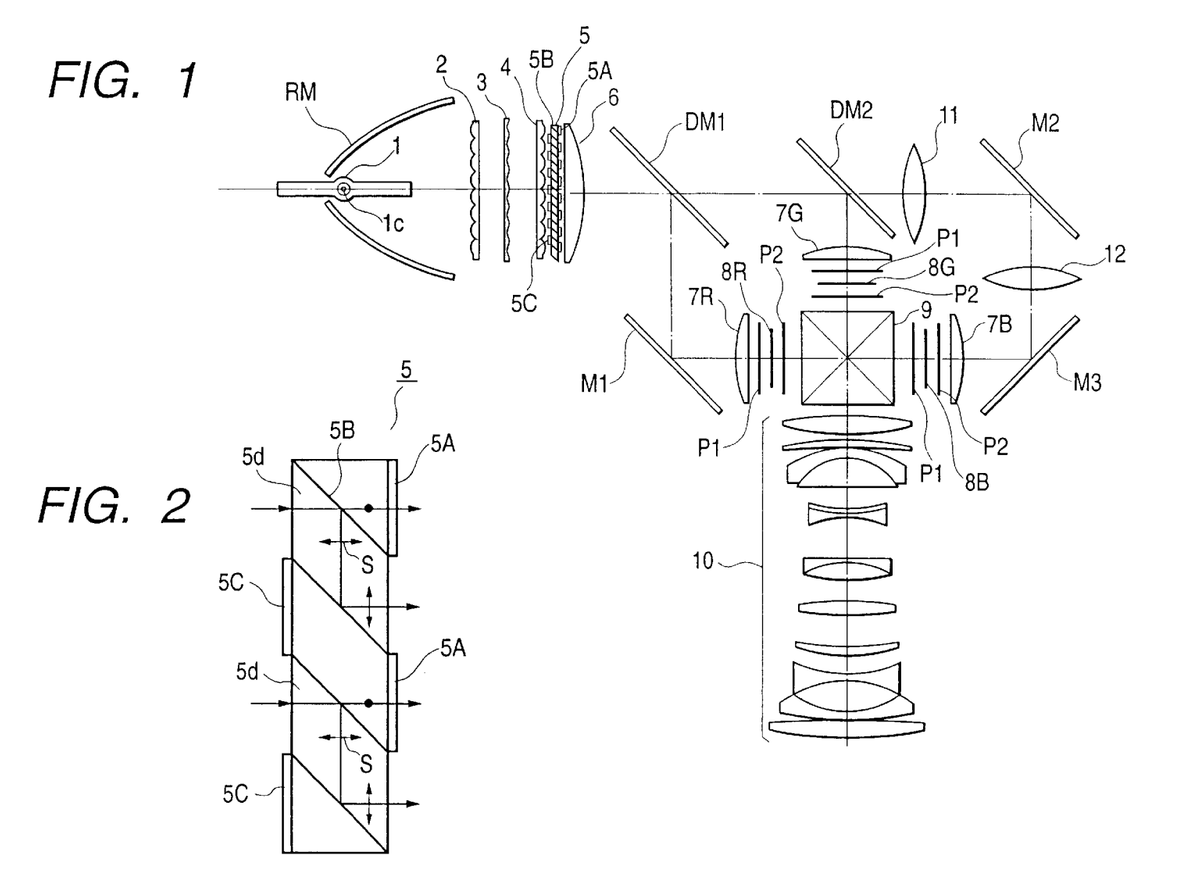
FIG. 1 is a schematic view showing the main part of the first embodiment of the present invention.
FIG. 2 is a view for explaining part of the present invention.

FIG. 1 is a schematic view showing the main part of the first embodiment of the present invention. Referring to FIG. 1, a metal halide lamp or the like is used as a light source (light-emitting tube) 1. A reflector (reflecting member) RM has a reflecting surface made of a parabolic or elliptic surface. The reflector in FIG. 1 is a parabolic mirror. The light beam emitted from a light-emitting portion 1c of the light source 1 is reflected by the reflector RM to be collimated. This collimated light is incident on the first lens array 2 (first optical element).

A first lens array 2 has a plurality of lenses (plano-convex lenses) 2a, each having a positive refracting power, regularly arranged on a flat plate. A second lens array (second optical element) 3 has a plurality of lenses (plano-concave lenses) 3a, each having a negative refracting power, regularly arranged on a flat plate.

A third lens array (third optical element) 4 has a plurality of lenses (plano-convex lenses) 4a, each having a positive refracting power, regularly arranged on a flat plate.

The first, second, and third lens arrays 2, 3, and 4 constitute the illumination system of a display apparatus.

The lenses 2a, 3a, and 4a constituting the first, second, and third lens arrays 2, 3, and 4 correspond to each other.

The first and second lens arrays 2 and 3 serve to form the light source image (secondary light source image) from the light-emitting tube 1 on the centers of the lenses 4a of the third lens array 4 or portions near the centers. A focal length f12 of the combined system of the first and second lens arrays 2 and 3 is almost equal to a focal length f23 of the combined system of the third and second lens arrays 4 and 3. The distance between the principal points of the first and second lens arrays 2 and 3 is set to be almost equal to that between the second and third lens arrays 3 and 4.

In order to reduce the spherical aberration, each lens 2a of the first lens array 2 is preferably in the form of a plano-convex lens that is curved outwardly toward the light source side. In order to produce coma inwardly, each lens 3a of the second lens array 3 is preferably in the form of a plano-concave lens that is curved inwardly toward the display portion side of each image modulating unit (to be described later). To reduce the spherical aberration, each lens of the third lens array 4 is preferably in the form of a plano-convex lens having a flat surface facing the light source side.

Light beams from the secondary light source images formed on or near the lens surfaces of the third lens array 4 are incident on prisms 5d constituting a polarization converting element array 5.

The polarization converting element array 5 has the structure shown in FIG. 2. Unpolarized light (randomly polarized light) that is incident on each polarization converting element of the polarization converting element array 5 emerges as linearly polarized light that is polarized in a specific direction. As shown in FIG. 2, the polarization directions of the polarized light beams emerging from the respective polarization converting elements coincide with each other.

The light incident on the polarization converting element array 5 is separated into P-polarized light and S-polarized light by a polarization separating layer 5B. The P-polarized light is transmitted through the polarization separating layer 5B, and the S-polarized light is reflected by the layer 5B. The P-polarized light is phase-converted by a $\lambda/2$ retardation plate 5A to be aligned with the polarization axis of the S-polarized light. As a consequence, all the light beams emerging from the polarization converting element 5 become polarized light beams having polarization axes in the same direction. The polarization converting element 5 has a blind-like light-shielding plate 5C.

The light beam emerging from the polarization converting element 5 is deflected by a first condenser lens 6 to be superimposed on display portions 8R, 8G, and 8B of image modulating units which are made up of liquid crystal panels for separately modulating R, G, and B light beams.

The red light of the light beam emitted from the first condenser lens 6 is reflected by a dichroic mirror DM1, and the remaining green light and blue light are transmitted. The red light reflected by the dichroic mirror DM1 is guided to the display portion 8R of the red image modulating unit through a reflecting mirror M1 and second condenser lens 7R. The light transmitted through the dichroic mirror DM1 is separated into green light and blue light by a dichroic mirror DM2. The green light is reflected by the dichroic mirror DM2 to be guided into the display portion 8G of the green image modulating unit through a second condenser lens 7G.

The blue light transmitted through the dichroic mirror DM2 is focused by a condenser lens 11 and reflected by a reflecting mirror M2. The reflected light is guided to the display portion 8B of the blue image modulating unit by a relay lens 12 through a reflecting mirror M3 and second condenser lens 7B.

Referring to FIG. 1, polarizing plates P1 and P2 are set on the incident and exit sides, respectively. The second condenser lenses 7R, 7G, and 7B serve to focus the light beam emerging from the first condenser lens 6 onto the entrance pupil of a projection lens 10. A cross-dichroic prism 9 is placed between the projection lens 10 and the display portions 8R, 8G, and 8B of the image modulating units to perform color synthesis.

The projection lens 10 is designed to be telecentric with respect to the display portions 8R, 8G, and 8B of the image modulating units. The incident angle on the dichroic film surface of the cross-dichroic prism 9 remains constant throughout the entire dichroic film, thereby preventing color irregularity due to changes in incident angle on the dichromic film. The light beams respectively modulated by the display portions 8R, 8G, and 8B of the image modulating units are subjected to color synthesis in the cross-dichroic prism 9. The resultant image is enlarged/projected on a screen (not shown) through the projection lens 10.

In the embodiment shown in FIG. 1, the lens array portion is made up of the three lens arrays 2, 3, and 4 respectively having positive, negative, and positive refracting powers and arranged in the order named from the light source 1 side. This arrangement makes it possible to reduce the size of the lens array portion in the optical axis direction.

The first lens array 2 is optically conjugate to the display portions 8R, 8G, and 8B of the image modulating units. Light beams from a plurality of secondary light source images formed on the respective lens surfaces of the third lens array 4 are superimposed/illuminated on the display portions 8R, 8G, and 8B through the succeeding lens system (6, 7, 11, 12).

Figure 3A:
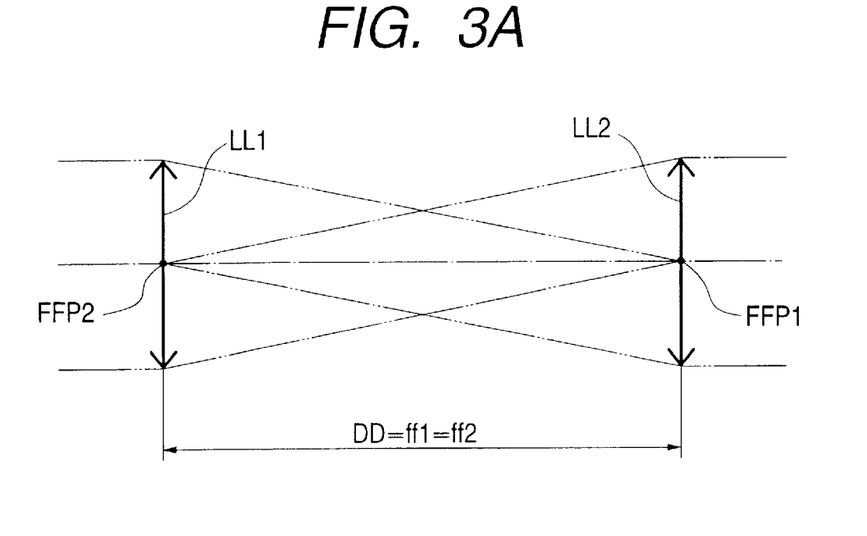
FIGS. 3A and 3B are views for explaining the optical paths of portions of illumination apparatuses according to the first embodiment of the present invention and the prior art.
Figure 3B:
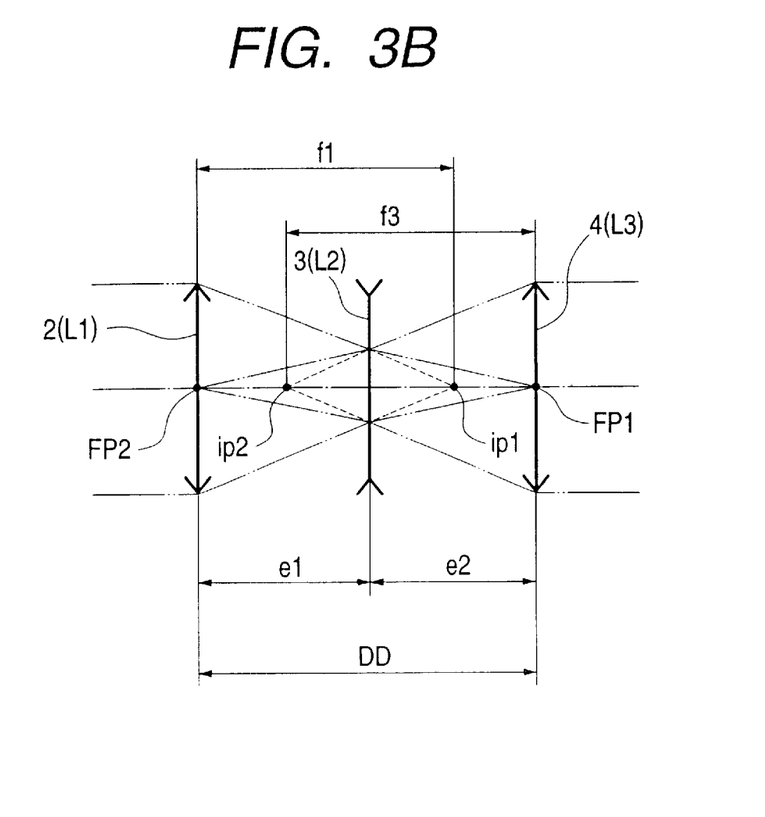

FIGS. 3A an 3B are views for explaining the principle on which the overall optical system is reduced in size by using three lens arrays in the illumination optical system of the present invention as compared with the conventional illumination optical system.

FIG. 3A shows the paraxial arrangement of one fly-eye lens portion when two lens arrays (integrator) are used in the prior art. The principal point of a microlens LL1 of the first lens array is spaced apart from the principal point of a microlens LL2 of the second lens array by a distance DD.

Both a focal length ff1 of the microlens LL1 of the first lens array and a focal length ff2 of the microlens LL2 of the second lens array are set to be equal to the principal point distance DD to make a focal position FFP1 of the first lens array coincide with the principal plane of the second lens array and also make a focal position FFP2 of the second lens array coincide with the principal plane of the first lens array.

With this arrangement, the image formed by one lens portion of the first lens array is efficiently projected on the liquid crystal panel by using the succeeding lens system.

FIG. 3B is a view showing the paraxial arrangements of the fly-eye lens portions of the three lens arrays 2, 3, and 4 constituting the illumination optical system of the present invention.

The principal point of one lens L1 of the first lens array 2 is spaced apart from that of one lens L2 of the second lens array 3 by a distance e1. The principal point of the lens L2 of the second lens array 3 is spaced apart from that of a lens L3 of the third lens array 4 by a distance e2.

The same combined focal length as that of the prior art in FIG. 3A can be obtained by reducing a focal length f1 of the first lens array 2 to ½ the focal length ff1 and doubling the size of a virtual image ip1 of the light source image, formed by the first lens array 2, by using the second lens array 3.

Likewise, a focal length f3 of the third lens array 4 is set to be equal to the focal length f1 of the first lens array 2, and the paraxial arrangements of the first and third lens arrays 2 and 4 are symmetrical with respect to the second lens array 3.

In this case, the image-side focal point of the combined system of the first and second optical elements is located at or near the third optical element, whereas the object-side focal point of the combined system of the second and third optical elements is located at or near the first optical element.

Note that the image-side focal point is the focal position set when collimated light is incident from the light source side. In addition, the object-side focal point is the focal position set when a collimated light beam is incident from the liquid crystal device side.

Assume that the fly-eye lens portion of the fly-eye integrator is made up of the first lens having a positive refracting power, second lens array having a negative refracting power, and third lens array having a positive refracting power, which are arranged in the order named from the light source side. In this case, in order to make a combined focal position FP1 of the first and second lens arrays L1 and L2 coincide with the principal plane of the third lens array L3 and also make a combined focal position FP2 of the third and second lens arrays L3 and L2 coincide with the principal plane of the first lens array L1, a paraxial arrangement is formed to satisfy $$f1=f3$$

$$f2=-(\tfrac{2}{3})\cdot f1$$

$$e1=e2=(\tfrac{2}{3})\cdot f1$$

By satisfying the above equations, the same optical effect as that in the prior art is realized with a length ⅔ the length of the optical system in the prior art.

This embodiment satisfies the following inequalities:

$$0.8 < f1/f3 < 1.2 \qquad (1)$$

$$-0.8 < f2/f1 < -0.5 \qquad (2)$$

$$0.5 < e1/f1 < 0.8 \qquad (3)$$

$$0.5 < e2/f1 < 0.8 \qquad (4)$$

where f1 is the focal length of the first optical element, f2 is the focal length of the second optical element, f3 is the focal length of the third optical element, e1 is the distance between the principal points of the first and second optical elements, and e2 is the distance between the principal points of the second and third optical elements.

Inequalities (1) to (4) define the neighborhoods of the above inequalities. The difference between the combined focal position of the first and second optical elements and the principal plane of the third optical element falls within an allowable range as long as the above focal lengths and principal point distances fall within the ranges defined by the above inequalities. Similarly, the difference between the combined focal position of the third and second optical elements and the principal plane of the first optical element falls within an allowable range, thus realizing an illumination optical system with high illumination efficiency.

As described above, according to this embodiment, a fly-eye integrator is formed as a telecentric type by forming the fly-eye lens portion using three lens arrays respectively having positive, negative, and positive refracting powers, thereby realizing a reduction in size in the optical axis directions Note that in the present invention, the numerical value ranges defined by inequalities (1) to (4) are more preferably set as follows:

$$0.85 < f1/f3 < 1.15 \tag{1a}$$

$$-0.75 < f2/f1 < -0.55 \tag{2a}$$

$$0.55 < e1/f1 < 0.75 \tag{3a}$$

$$0.55 < e2/f1 < 0.75 \tag{4a}$$

Figure 4:
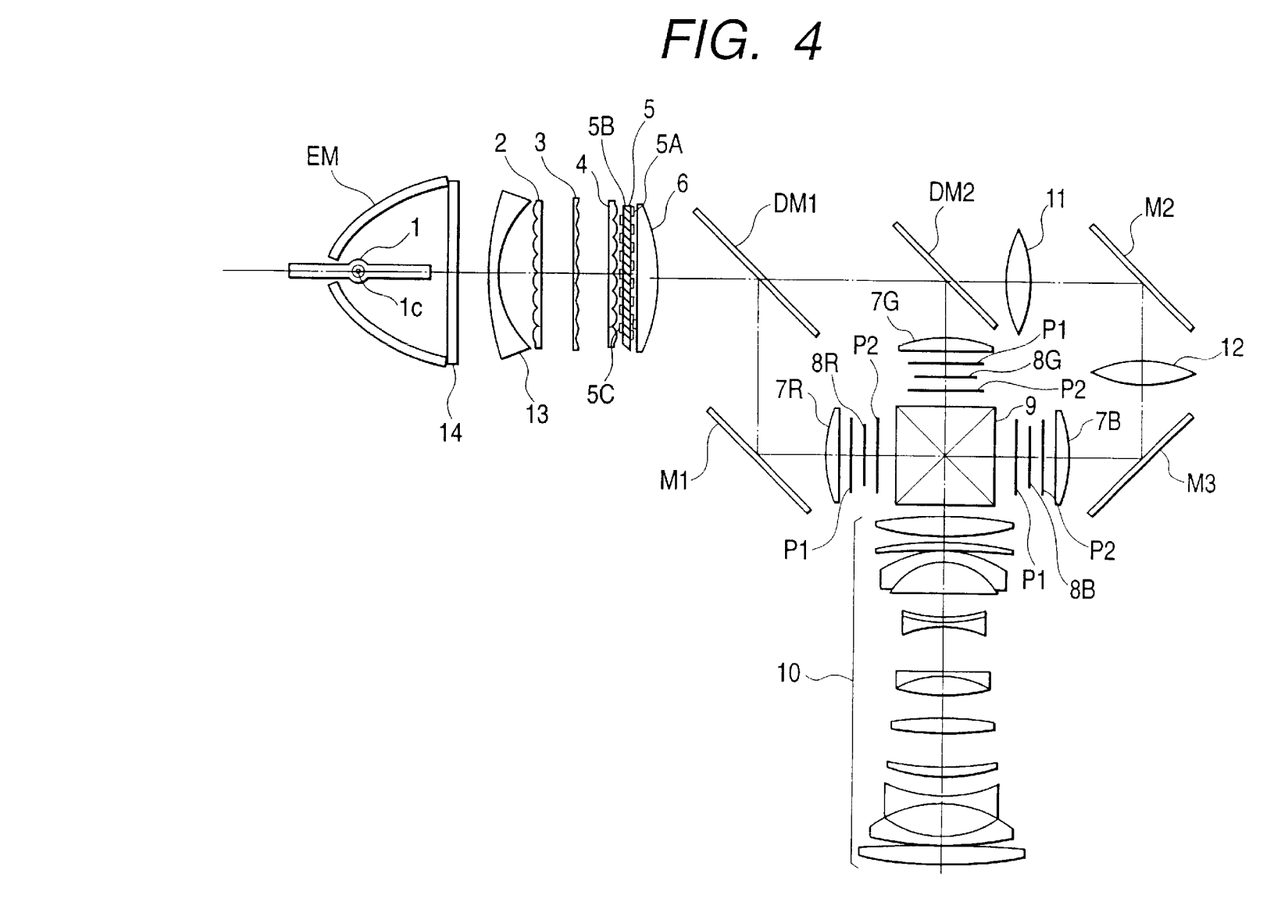
FIG. 4 is a schematic view showing the main part of the second embodiment of the present invention.

FIG. 4 is a schematic view showing the main part of the second embodiment of the present invention. The arrangement of this embodiment is the same as that of the embodiment shown in FIG. 1 except that an elliptic mirror EM is used in place of the parabolic mirror, a cover glass 14 is used on the exit side of the elliptic mirror EM, and a negative meniscus lens 13 having a convex surface facing the light source 1 side is used between a light source 1 and a first lens array 2.

This embodiment uses an elliptic mirror as a focusing lens to increase the distance between the vertex of a focusing reflecting mirror and the light source, thus reducing the loss of light due to a hole of the focusing reflecting mirror. In addition, the vignetting due to the entrance pupil of a projection lens 10 is reduced by decreasing the diameter of the light beam emerging from the elliptic mirror serving as a focusing reflecting mirror.

The negative meniscus lens 13 serves to convert the light compressed by the elliptic mirror EM into collimated light again. The negative lens 13 has the meniscus shape that is curved outwardly toward the light source side to increase the distance from the light source toward the peripheral portion of the lens so as to increase the compression ratio of the light reflected by the peripheral portion, thereby improving the illumination efficiency. The arrangement of this embodiment is the same as that shown in FIG. 1 except for the above arrangement.

The arrangement shown in FIG. 4 uses the space produced by the fly-eye integrator of the present invention to improve the illumination efficiency. The illumination efficiency is improved by about 20% as a whole in comparison with the prior art.

The following are the numerical embodiments of the respective elements ranging from the first lens array (first optical element) to the second condenser lens (7G, 7R) in the first and second embodiments shown in FIGS. 1 and 4. Table-1 shows the relationship between inequalities (1) to (4).

In the respective numerical embodiments, Ri is the radius of curvature of the ith lens surface from the light source side, Di is the surface distance of the ith lens surface from the light source side, and Ni is the refractive index at the d line of the ith lens from the light source side.

Numerical Embodiment 1 (corresponding to the elements ranging from the light source to the image display portion in FIG. 1)

Parabolic Mirror F; 7 mm

Distance between Vertex of Parabolic Mirror and First Optical Element: 48

| R1; 12.9 | D1; 3 | N1; 1.51633 (first optical element) |
| R2; ∞ | D2; 12.863 | |
| R3; ∞ | D3; 1 | N2; 1.51633 (second optical element) |
| R4; 7.936 | D4; 14.522 | |
| R5; ∞ | D5; 3 | N3; 1.51633 (third optical element) |
| R6; −12.9 | D6; 2.7 | |
| R7; ∞ | D7; 3.9 | N4; 1.51633 (polarization converting element) |
| R8; ∞ | D8; 3.5 | |
| R9; ∞ | D9; 9 | N5; 1.51633 (first condenser) |
| R10; −104.9 | D10; 182 | |
| R11; 101.35 | D11; 14 | N6; 1.51633 (second condenser) |
| R12; ∞ | D12; 14 | |
| R13; ∞ | | (image display surface) |

Numerical Embodiment 2 (corresponding to the elements ranging from the light source to the image display portion in FIG. 4)

Elliptic Mirror F1; 10 mm F2: 200 mm

Distance from Vertex of Elliptic Mirror to Vertex of Negative Meniscus Lens; 60.64

| R1; 133.156 | D1; 4 | N1; 1.51633 (negative meniscus lens) |
| R2; 47.427 | D2; 15 | |
| R1; 12.9 | D1; 31 | N2; 1.51633 (first optical element) |
| R2; ∞ | D2; 11.863 | |
| R3; ∞ | D3; 1 | N3; 1.51633 (second optical element) |
| R4; 7.936 | D4; 14.522 | |
| R5; ∞ | D5; 3 | N4; 1.51633 (third optical element) |
| R6; −12.9 | D6; 2.7 | |
| R7; ∞ | D7; 3.9 | N5; 1.51633 (polarization converting element) |
| R8; ∞ | D8; 3.5 | |
| R9; ∞ | D9; 9 | N6; 1.51633 (first condenser) |
| R10; −104.9 | D10; 182 | |
| R11; 101.35 | D11; 4 | N7; 1.51633 (second condenser) |
| R12; ∞ | D12; 14 | |
| R13; ∞ | | |

TABLE 1

| | Numerical Embodiment 1 | Numerical Embodiment 2 |
| --- | --- | --- |
| Inequality (1) | 1 | 1 |
| Inequality (2) | −0.64 | −0.64 |
| Inequality (3) | 0.62 | 0.58 |
| Inequality (4) | 0.66 | 0.66 |

According to the present invention, as has been described above, there is provided an illumination apparatus which can reduce the size of an illumination optical system in the optical axis direction by using three lens arrays having appropriate refracting powers for part of the illumination optical system without decreasing the size of each lens of the lens arrays, and a projection apparatus using the illumination apparatus.

The illumination apparatus of the present invention, in particular, can attain a reduction in the size of the illumination optical system. In addition, the illumination efficiency can be improved by using the space produced as the size of the illumination system is reduced. This makes it possible to realize a projection apparatus which is compact as a whole and has high illumination efficiency.

What is claimed is:

1. A projecting apparatus comprising:
an illumination optical system for illuminating a display device with light from a light source; and
a projection optical system for projecting the light from said display device onto a surface to be projected,
wherein said illumination optical system includes a first lens array unit having a plurality of positive lens portions juxtaposed with each other, a second lens array unit having a plurality of negative lens portions juxtaposed with each other, and a third lens array unit having a plurality of positive lens portions juxtaposed with each other, and said first to third lens array units are sequentially arranged from alight source side.

2. An apparatus according to claim 1, wherein a focal point at the light source side of combined system of said second and third lens array units is located near said first lens array unit.

3. An apparatus according to claim 1, wherein said illumination optical system includes a parabolic mirror for reflecting the light from the light source.

4. An apparatus according to claim 1, wherein said illumination optical system includes an elliptic mirror for reflecting the light from the light source, and a lens having a negative refracting power is provided between said elliptic mirror and said first lens array unit.

5. An apparatus according to claim 1, wherein each of the plurality of positive lens portions of said first lens array unit is made of a plano-convex lens having a convex surface facing the light source side, each of the plurality of negative lens portions of said second lens array unit is made of a plano-concave lens having a flat surface facing the light source side, and each of the plurality of positive lens portions of said third lens array unit is made of a plano-convex lens having a flat surface facing the light source side.

6. An apparatus according to claim 1, wherein said apparatus satisfies $$0.8<f1/f3<1.2$$

$$0.8<f2/f1<-0.5$$

$$0.5<e1/f1<0.8$$

$$0.5<e2/f1<0.8$$

where f1 is a focal length of the lens portion of said first lens array unit, f2 is a focal length of the lens portion of said second lens array unit, f3 is a focal length of the lens portion of said third lens array unit, e1 is a distance between principal points of the lens portions of said first and second lens array units, and e2 is a distance between principal points of the lens portions of said second and third lens array units.

7. An apparatus according to claim 4, wherein said lens having the negative refracting power has a meniscus shape having a convex surface facing the light source side.

8. An apparatus according to claim 1, wherein a plurality of images of said light source are formed at or near positions of the plurality of positive lens portions of said third lens array unit.

9. An apparatus according to claim 1, said light source which generates a plurality of images further comprises a polarization converting element array for separately converting light beams from the plurality of light source images into polarized light beams.

10. An illumination apparatus for illuminating a display device with a light beam from a light source through an illumination optical system, said illumination optical system including a first lens array unit having a plurality of positive lens portions juxtaposed with each other, a second lens array unit having a plurality of negative lens portions juxtaposed with each other, and a third lens array unit having a plurality of positive lens portions juxtaposed with each other, said first to third lens array units being sequentially arranged from a light source side,
wherein a focal point at the light source side of combined system of said second and third lens array units is located near said first lens array unit.

11. An illumination apparatus for illuminating a display device with a light beam from a light source through an illumination optical system, said illumination optical system including a first lens array unit having a plurality of positive lens portions juxtaposed with each other, a second lens array unit having a plurality of negative lens portions juxtaposed with each other, and a third lens array unit having a plurality of positive lens portions juxtaposed with each other, said first to third lens array units being sequentially arranged from a light source side,
wherein said illumination apparatus includes a parabolic mirror for reflecting the light beam from the light source.

12. An illumination apparatus for illuminating a display device with a light beam from a light source through an illumination optical system, said illumination optical system including a first lens array unit having a plurality of positive lens portions juxtaposed with each other, a second lens array unit having a plurality of negative lens portions juxtaposed with each other, and a third lens array unit having a plurality of positive lens portions juxtaposed with each other, said first to third lens array units being sequentially arranged from a light source side,
wherein said illumination apparatus includes an elliptic mirror for reflecting the light beam from the light source, and a lens having a negative refracting power is provided between said elliptic mirror and said first lens array unit.

13. An apparatus according to claim 12, wherein said lens having the negative refracting power has a meniscus shape having a convex surface facing the light source side.

14. An illumination apparatus for illuminating a display device with a light beam from a light source through an illumination optical system, said illumination optical system including a first lens array unit having a plurality of positive lens portions juxtaposed with each other, a second lens array unit having a plurality of negative lens portions juxtaposed with each other, and a third lens array unit having a plurality of positive lens portions juxtaposed with each other, said first to third lens array units being sequentially arranged from a light source side, wherein each of the plurality of positive lens portions of said first lens array unit is made of a plano-convex lens having a convex surface facing the light source side, each of the plurality of negative lens portions of said second lens array unit is made of a plano-concave lens having a flat surface facing the light source side, and each of the plurality of positive lens portions of said third lens array unit is made of a plano-convex lens having a flat surface facing the light source side.

15. An illumination apparatus for illuminating a display device with a light beam from a light source through an illumination optical system, said illumination optical system including a first lens array unit having a plurality of positive lens portions juxtaposed with each other, a second lens array unit having a plurality of negative lens portions juxtaposed with each other, and a third lens array unit having a plurality of positive lens portions juxtaposed with each other, said first to third lens array units being sequentially arranged from a light source side, wherein said apparatus satisfies $$0.8 < f1/f3 < 1.2$$

$$-0.8 < f2/f1 < -0.5$$

$$0.5 < e1/f1 < 0.8$$

$$0.5 < e2/f1 < 0.8$$

where f1 is a focal length of the lens portion of said first lens array unit, f2 is a focal length of the lens portion of said second lens array unit, f3 is a focal length of the lens portion of said third lens array unit, e1 is a distance between principal points of the lens portions of said first and second lens array units, and e2 is a distance between principal points of the lens portions of said second and third lens array units.

16. An illumination apparatus for illuminating a display device with a light beam from a light source through an illumination optical system, said illumination optical system including a first lens array unit having a plurality of positive lens portions juxtaposed with each other, a second lens array unit having a plurality of negative lens portions juxtaposed with each other, and a third lens array unit having a plurality of positive lens portions juxtaposed with each other, said first to third lens array units being sequentially arranged from a light source side, wherein a plurality of images of said light source are formed at or near positions of the plurality of positive lens portions of said third lens array unit.

17. An illumination apparatus for illuminating a display device with a light beam from a light source through an illumination optical system, said illumination optical system including a first lens array unit having a plurality of positive lens portions juxtaposed with each other, a second lens array unit having a plurality of negative lens portions juxtaposed with each other, and a third lens array unit having a plurality of positive lens portions juxtaposed with each other, said first to third lens array units being sequentially arranged from a light source side, where in said light source which generates a plurality of images further comprises a polarization converting element array for separately converting light beams from the plurality of light source images into polarized light beams.

18. A projection apparatus comprising a projection optical system for projecting image light from a liquid crystal display device illuminated by an illumination apparatus for illuminating the display device with a light beam from a light source through an illumination optical system, said illumination optical system including a first lens array unit having a plurality of positive lens portions juxtaposed with each other, a second lens array unit having a plurality of negative lens portions juxtaposed with each other, and a third lens array unit having a plurality of positive lens portions juxtaposed with each other, said first to third lens array units being sequentially arranged from a light source side.

* * * * *

UNITED STATES PATENT AND TRADEMARK OFFICE
CERTIFICATE OF CORRECTION

PATENT NO.    : 6,414,795 B1
DATED         : July 2, 2002
INVENTOR(S)   : Saburo Sugawara It is certified that error appears in the above-identified patent and that said Letters Patent is hereby corrected as shown below:

Column 3,
Line 2, "located-near" should read -- located near --

Column 6,
Line 67, "directions" should read -- direction. --

Column 9,
Line 46, "0.8<f2/f1<-0.5" should read -- -0.8<f2/f1<-0.5 --

Column 12,
Line 14, "where in" should read -- wherein --

Signed and Sealed this

Twenty-ninth Day of October, 2002

Attest:

Attesting Officer

JAMES E. ROGAN
Director of the United States Patent and Trademark Office